(12) United States Patent
Billhartz (10) Patent No.: US 7,027,426 B2
(45) Date of Patent: Apr. 11, 2006

(54) MULTI-CHANNEL MOBILE AD HOC NETWORK

(75) Inventor: Thomas Jay Billhartz, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 67 days.

(21) Appl. No.: 10/212,594

(22) Filed: Aug. 5, 2002

(65) Prior Publication Data

US 2004/0022224 A1    Feb. 5, 2004

(51) Int. Cl.
*H04Q 7/24* (2006.01)

(52) U.S. Cl. ...................... 370/338; 370/312

(58) Field of Classification Search ........... 370/220, 370/223, 238, 254–258, 310, 338, 345, 351, 370/464, 912, 913, 312, 329, 349, 390; 709/220, 709/223, 238–242; 455/422, 432, 433, 435, 455/456, 445, 450, 453
See application file for complete search history.

(56) References Cited

U.S. PATENT DOCUMENTS

| | | | |
|---|---|---|---|
| 5,412,654 A | 5/1995 | Perkins | 370/94.1 |
| 5,987,011 A | 11/1999 | Toh | 370/331 |
| 6,304,556 B1 | 10/2001 | Haas | 370/254 |
| 6,308,843 B1 * | 10/2001 | De Boer | 211/119.01 |
| 6,385,174 B1 | 5/2002 | Li | 370/252 |
| 2001/0033556 A1 | 10/2001 | Krishnamurthy et al. | 370/329 |

OTHER PUBLICATIONS

Lee, Routing and Multicasting Strategies in Wireless Mobile Ad Hoc Networks, Dissertation, University of California, pp. 1-260, 2000.*
Royer et al, An Implementation Study of the AODV Routing Protocol, IEEE, pp. 1003-1008, 2000.*
Sugano et al, Performance Evaluation of a Wireless Ad Hoc Networks: Flexible Radio Network (FRN), IEEE, pp. 350-354, 2000.*
Perkins et al, Internet Draft, Quality of Service for Ad hoc On-Demand Distance Vector Routing, pp. 1-7, 2000.*
Chang et al, Routing in wireless/mobile ad-hoc networks via dynamic group construction, Baltzer Science Publishers, pp. 27-37, 2000.*
Bangalore et al, DSR based mobile adhoc routing with a Multichannel Base Station infrastructure, pp. 1-10.*
Chakrabarti et al., "*QoS Issues in Ad Hoc Wireless Networks*", , IEEE Communications Magazine, (Feb. 2001), pp. 142-148.

(Continued)

*Primary Examiner*—Frank Duong
(74) *Attorney, Agent, or Firm*—Allen, Dyer, Doppelt, Milbrath & Gilchrist, P.A.

(57) ABSTRACT

A mobile ad hoc network includes a plurality of wireless mobile nodes and a plurality of wireless communication links connecting the plurality of nodes together over a plurality of channels. The method includes sending a route request over each of the plurality of channels to discover routing to a destination node, and selecting a route to the destination node on at least one of the plurality of channels. The route request may be sent over each of the plurality of channels sequentially, and the route request preferably includes a source node channel identifier.

27 Claims, 7 Drawing Sheets

OTHER PUBLICATIONS

Chen, "*Routing Support for Providing Guaranteed End-to-End Quality-of-Service*," Ph.D. thesis, Univ. of Illinois at Urbana-Champaign, http://cairo.cs.uiuc.edu/papers/scthesis.ps. 1999.

Mirhakkak et al., *Dynamic Quality-of-Service of Mobile Ad Hoc Networks*, MITRE Corp., 2000.

Van Dyck et al., *Distributed Sensor Processing Over an Ad-Hoc Wireless Network: Simulation Framework And Performance Criteria*, Proceedings IEEE Milcom, Oct. 2001.

Zhu, *Medium Access Control and Quality-of-Service for Mobile Ad Hoc Networks*, PHD Thesis, Department of Computer Engineering, University of Maryland, College Park, MD, 2001.

Royer et al., *A Review of Current Routing Protocols for Ad Hoc Mobile Wireless Networks*, IEEE Personal Communications, Apr. 1999, pp. 46-55.

Corson et al., *A Reservation-Based Multicast (RBM) Routing Protocol for Mobile Networks: Initial Route Constructions Phase*, ACM/I. 1, No. 4, 1995, pp. 1-39.

Xiao et al., *A Flexible Quality of Service Model for Mobile Ad Hoc Networks*, IEEE VTC2000-spring, Tokyo, Japan, May 2000.

Wu et al., *QoS Support in Mobile Ad Hoc Networks*, Computing Science Department, University of Alberta, no date available.

Corson et al., *Mobile Ad Hoc Networking (MANET): Routing Protocol Performance Issues and Evaluation Considerations*, Network Working Group, Internet Engineering Task Force (IETF) MANET Working Group, Internet Draft, Jan. 1999.

Haas et al., *The Bordercast Resolution Protocol (BRP) for Ad Hoc Networks*, Internet Engineering Task Force (IETF) MANET Working Group, Internet Draft, Jun. 2001.

Haas et al., *The Interzone Routing Protocol (IERP) for Ad Hoc Networks*, Internet Engineering Task Force (IETF) MANET Working Group, Internet Draft, Jun. 2001.

Haas et al., *The Intrazone Routing Protocol (IERP) for Ad Hoc Networks*, Internet Engineering Task Force (IETF) MANET Working Group, Internet Draft, Jun. 2001.

Clausen et al. *Optimized Link State Routing Protocol*, Internet Engineering Task Force (IETF) MANET Working Group, Internet Draft, Oct. 31, 2001.

Perkins et al., *Quality of Service in Ad Hoc On-Demand Distance Vector Routing*, Internet Engineering Task Force (IETF) MANET Working Group, Internet Draft, Jul. 2000.

Park et al., *Temporally-Ordered Routing Algorithm (TORA) Versoin 1 Functional Specification*, Internet Engineering Task Force (IETF) MANET Working Group, Internet Draft, Jul. 20, 2001.

Ogier et al., *Topology Broadcast Based on Reserve-Path Forwarding (TBRPF)*, Internet Engineering Task Force (IETF) MANET Working Group, Internet Draft, Jan. 10, 2002.

Gerla et al., *Landmark Routing Protocol (LANMAR) for Large Scale Ad Hoc Networks*, Internet Engineering Task Force (IETF) MANET Working Group, Internet Draft, Dec. 17, 2001.

Hu et al., *Flow State in the Dynamic Socurce Routing Protocol for Mobile Ad Hoc Network*, Internet Engineering Task Force (IETF) MANET Working Group, Internet Draft, Feb. 23, 2001.

Gerla et al., *Fisheye State Routing Protocol (FSR) for Ad Hoc Networks*, Internet Engineering Task Force (IETF) MANET Working Group, Internet Draft, Dec. 17, 2001.

Johnson et al., *The Dynamic Source Routing Protocol for Mobile Ad Hoc Networks (DSR)*, Internet Engineering Task Force (IETF) MANET Working Group, Internet Draft, Nov. 21, 2001.

Perkins et al., *Ad hoc On-Demand Distance Vector (ADOV) Routing*, Internet Engineering Task Force (IETF) MANET Working Group, Internet Draft, Nov. 9, 2001.

Perkins et al., "Multicast Operation of the Ad-Hoc On-Demand Distance Vector Routing", IEEE, pp. 1-11, 1999.

Perkins et al., "Multicast Operation of the Ad-Hoc On Demand Distance Vector Routing Protocol", http://citeseer.nj.nec.com/royer99multicast.html, pp. 1-12, 1999.

Tseng et al., "A Multi-Channel MAC Protocol with Power Control for Multi-Hop Mobile Ad Hoc Networks", IEEE, pp. 419-424, 2001.

\* cited by examiner

MULTI-CHANNEL MOBILE AD HOC NETWORK

FIELD OF THE INVENTION

The present invention relates to the field of communication networks, and, more particularly, to mobile ad hoc wireless networks and related methods.

BACKGROUND OF THE INVENTION

A rapidly developing area of wireless networks is mobile ad hoc networks. Physically, a mobile ad hoc network includes a number of geographically-distributed, potentially mobile nodes wirelessly connected by one or more radio frequency channels. Compared with other type of networks, such as cellular networks or satellite networks, the most distinctive feature of mobile ad hoc networks is the lack of any fixed infrastructure. The network is formed of mobile nodes only, and a network is created on the fly as the nodes transmit to or receive from other nodes. The network does not in general depend on a particular node and dynamically adjusts as some nodes join or others leave the network.

An ad hoc network can be quickly deployed and provide much needed communications. Ad hoc networks will allow people to exchange data in the field or in a class room without using any network structure except the one they create by simply turning on their computers or PDAs, for example.

New applications for mobile ad hoc networks will continue to emerge and become an important part of the communication structure. Due to the lack of a fixed infrastructure, nodes must self-organize and reconfigure as they move, join or leave the network. All nodes could potentially be functionally identical and there may not be any natural hierarchy or central controller in the network. Many network-controlling functions are distributed among the nodes. Nodes are often powered by batteries and have limited communication and computation capabilities. The bandwidth of the system is usually limited. The distance between two nodes often exceeds the radio transmission range, and a transmission has to be relayed by other nodes before reaching its destination. Consequently, a network has a multihop topology, and this topology changes as the nodes move around.

The Mobile Ad-Hoc Networks (MANET) working group of the Internet Engineering Task Force (IETF) has been actively evaluating and standardizing routing, including multicasting, protocols. Because the network topology changes arbitrarily as the nodes move, information is subject to becoming obsolete, and different nodes often have different views of the network, both in time (information may be outdated at some nodes but current at others) and in space (a node may only know the network topology in its neighborhood usually not far away from itself).

A routing protocol needs to adapt to frequent topology changes and with less accurate information. Because of these unique requirements, routing in these networks is very different from others. Gathering fresh information about the entire network is often costly and impractical. Many routing protocols are reactive (on-demand) protocols: they collect routing information only when necessary and to destinations they need routes to, and do not generally maintain unused routes after some period of time. This way the routing overhead is greatly reduced compared to pro-active protocols which maintain routes to all destinations at all times. It is important for a protocol to be adaptive. Ad Hoc on Demand Distance Vector (AODV), Dynamic Source Routing (DSR) and Temporally Ordered Routing Algorithm (TORA) are representative of on-demand routing protocols presented at the MANET working group.

Examples of other various routing protocols include Destination-Sequenced Distance Vector (DSDV) routing which is disclosed in U.S. Pat. No. 5,412,654 to Perkins, and Zone Routing Protocol (ZRP) which is disclosed in U.S. Pat. No. 6,304,556 to Haas. ZRP is a hybrid protocol using both proactive and reactive approaches based upon distance from a source node.

These conventional routing protocols use a best effort approach in selecting a route from the source node to the destination node. Typically, the number of hops is the main criteria (metric) in such a best effort approach. In other words, the route with the least amount of hops is selected as the transmission route. However, Quality-of-service (QoS) routing in mobile ad hoc networks is also gaining interest. To provide quality-of-service, the protocol needs not only to find a route but also to secure the resources along the route. Because of the limited, shared bandwidth of the network, and lack of central controller which can account for and control these limited resources, nodes must negotiate with each other to manage the resources required for QoS routes. This is further complicated by frequent topology changes. Due to these constraints, QoS routing is more demanding than best-effort routing.

Also, as mentioned, the bandwidth of a typical ad-hoc network is limited. Conventional mobile ad-hoc network routing protocols assume that all nodes are on the same channel permanently. This single channel operation is a factor in the bandwidth availability. Although some networks may use a separate control channel to reduce overhead on the transmission channel, conventional mobile ad-hoc networks do not utilize multiple channels for transmitting packet data.

SUMMARY OF THE INVENTION

In view of the foregoing background, it is therefore an object of the present invention to provide a multichannel mobile ad hoc network to efficiently make use of a plurality of channels.

This and other objects, features, and advantages in accordance with the present invention are provided by a method for operating a mobile ad hoc network over a plurality of channels. The network includes a plurality of wireless mobile nodes and a plurality of wireless communication links connecting the plurality of nodes together over the plurality of channels. The method includes, at a source node, sending a route request over each of the plurality of channels to discover routing to a destination node, and selecting a route to the destination node on at least one of the plurality of channels. The route request may be sent over each of the plurality of channels sequentially, and the route request preferably includes a source node channel identifier.

Also, each intermediate node may determine whether the intermediate node can support the route requested and, if so, forward the route request to one of other intermediate nodes and the destination node. The intermediate node will forward the route request over the plurality of channels. Any node that has already heard this request will not continue this flooding. Furthermore, the method preferably includes generating a reply to the source node for each discovered route upon receiving the route request at the destination node. Generating the reply to the source node for each discovered route preferably includes sending the reply back to the source node along the discovered route in reverse. The source node sends a transmission to the destination node along the selected route, which may span several channels.

Before selecting the route, the source node may prioritize the discovered routes by calculating a metric for each discovered route to the destination nod. The metric may be based upon at least one of available bandwidth, error rate, end-to-end delay, end-to-end delay variation, hop count, expected path durability, and priority. The selected route to the destination node may include more than one of the plurality of channels. In other words, the selected route may be wholly, or in part, on a different channel than the source node.

A system aspect of the invention is directed to a multichannel mobile ad hoc network including a plurality of mobile nodes, and a plurality of wireless communication links connecting the plurality of mobile nodes together over a plurality of channels. Each mobile node includes a communications device to wirelessly communicate with other nodes of the plurality of nodes via the wireless communication links, and a controller to route communications via the communications device. The controller includes a route discovery unit to transmit route requests over each of the plurality of channels to discover routing to a destination node, and a route selection unit to select a route to the destination node on at least one of the plurality of channels. The route discovery unit may send the route request over each of the plurality of channels sequentially, and the route request may include a channel identifier. The selected route to the destination node may include more than one of the plurality of channels.

The controller may further include a route request processing unit to determine whether the node can support the route requested and, if so, to forward the route request to one of other intermediate nodes and the destination node. Also, the controller may include a reply generator to generate a route reply to a source node for each discovered route. Again, generating the reply to the source node for each discovered route preferably includes sending the reply back to the source node along the discovered route in reverse.

The controller may also include a data transmission unit to send a transmission to the destination node along the selected route, and a route prioritizing unit to prioritize discovered routes. Again, prioritizing may include calculating a metric for each discovered route to the destination node. The metric may be based upon at least one of available bandwidth, error rate, end-to-end delay, end-to-end delay variation, hop count, expected path durability, and priority.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Referring initially to FIGS. 1–5 and 8, a method for determining a route from a source node to a destination node in a mobile ad hoc network 20 will now be described. The network 20 includes a plurality of mobile nodes 30 including the source node S and the destination node D with intermediate nodes A-C and E-N therebetween. Also, in this example, nodes Y and Z are not within communication range of any of the other illustrated nodes 30. The nodes 30, such as laptop computers, personal digital assistants (PDAs) or mobile phones, are connected by wireless communication links 32 as would be appreciated by the skilled artisan. Contrary to conventional mobile ad-hoc networks, the communication links 32 exist over a plurality of channels, for example, between three to ten channels.

Figure 8:
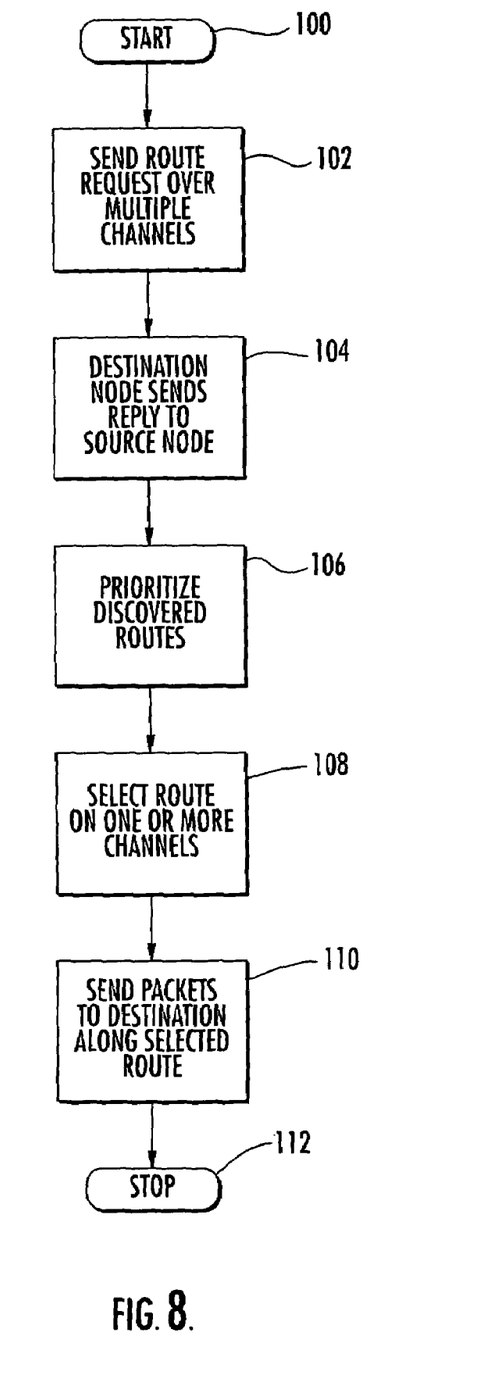
FIG. 8 is a flowchart illustrating the method steps for multichannel routing in a mobile ad hoc network in accordance with the present invention.

The method begins (block 100) and includes transmitting a route requests RREQ from the source node S to discover routing to the destination node D over multiple channels, as indicated at block 102 in FIG. 8. the source node S does not currently know what channel the destination node D is normally on. In the example illustrated in FIG. 1, the source node sends the route request RREQ to intermediate nodes A-C. The source node S and node C may normally be on a first channel, node B may normally be on a second channel, and node A may normally be on yet a third channel, for example. So, the source node S sends the route request RREQ over all the existing channels that the network is currently operating on to reach all nodes 30 within one-hop. Preferably, the route request RREQ would include a source node channel identifier indicating what channel the source node S is on.

Figure 1:
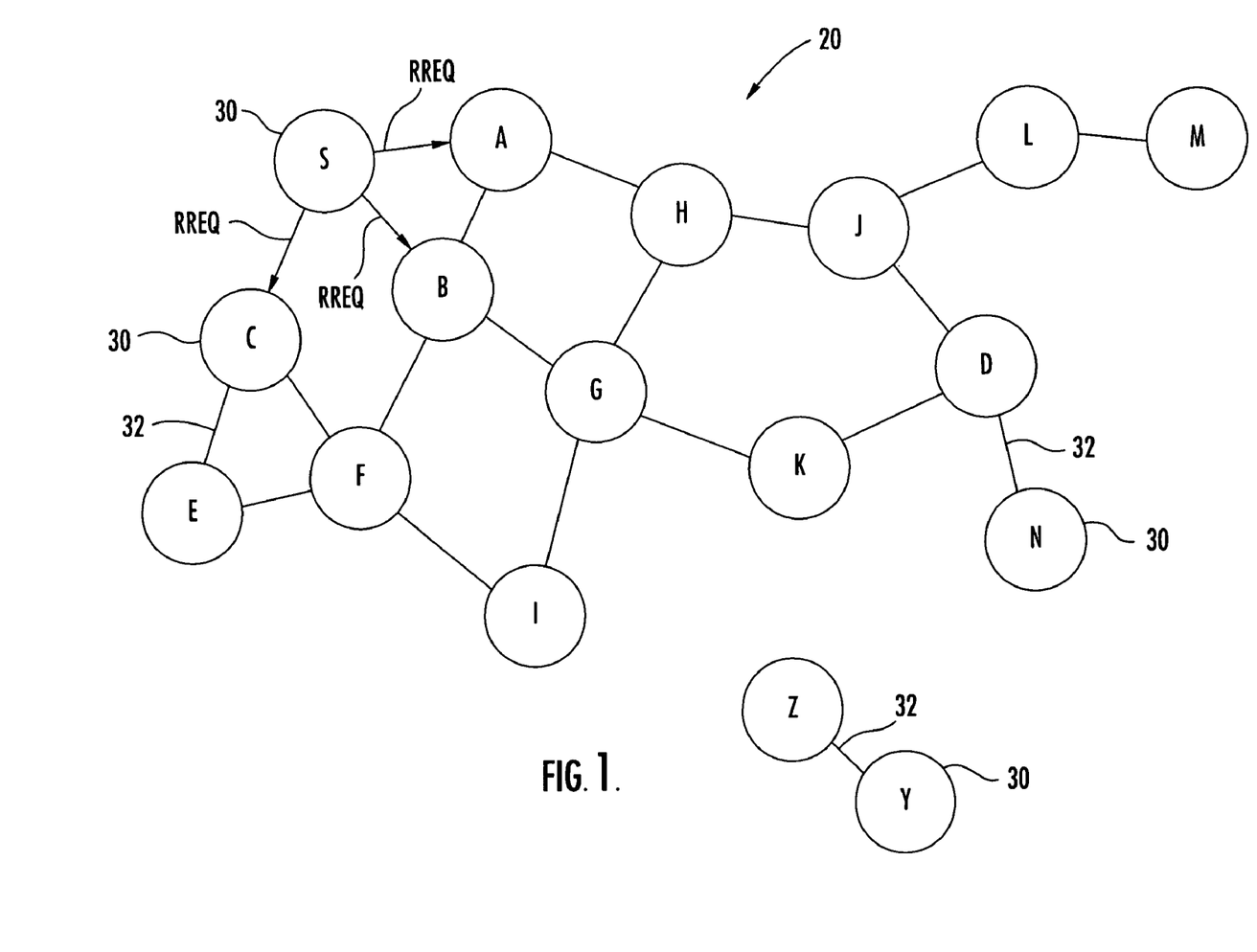
FIGS. 1–5 are schematic diagrams of a multichannel mobile ad hoc network in accordance with the present invention.
Figure 2:
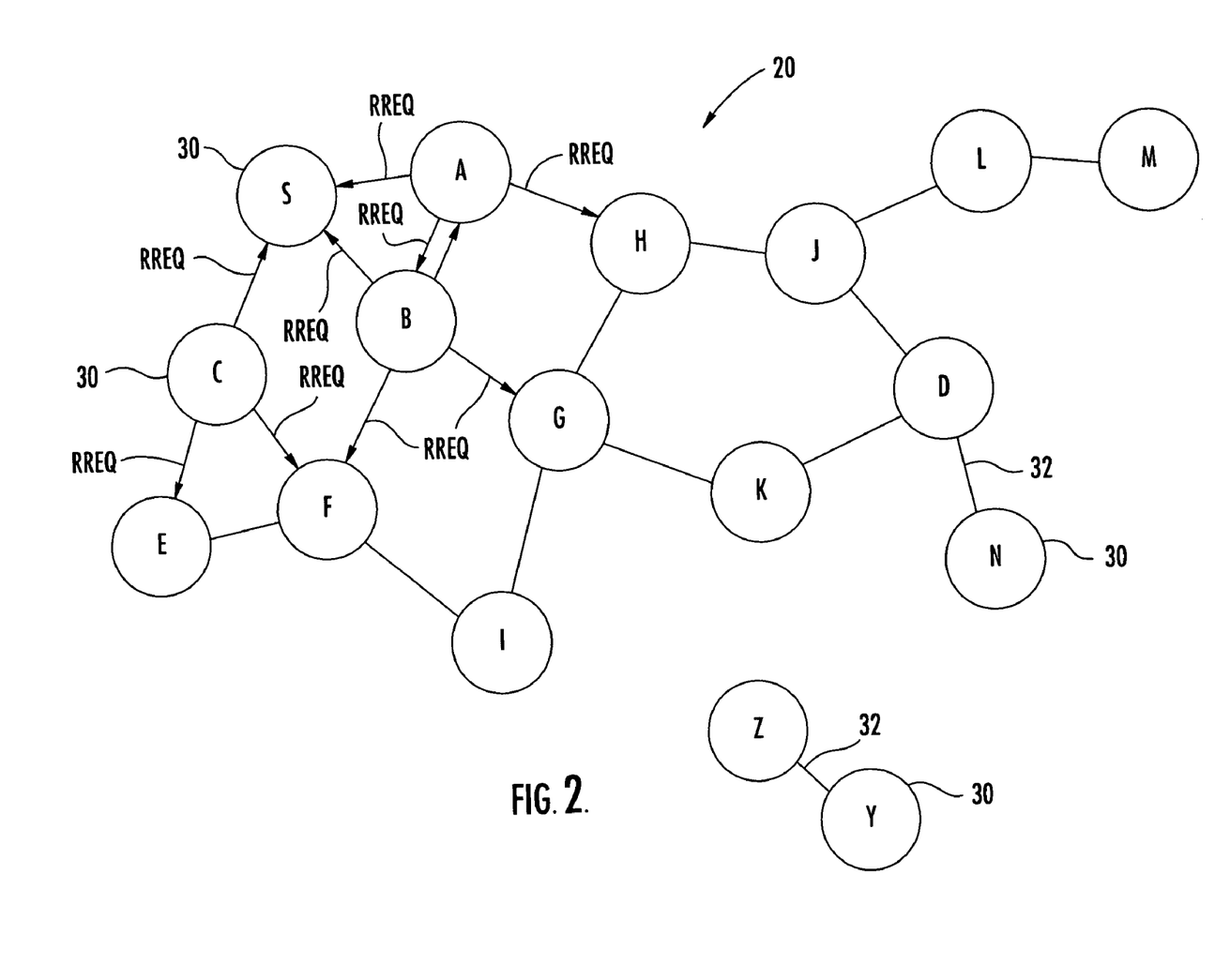

Separately, on each channel, route discovery proceeds as usual (FIG. 2). Each intermediate node A, B and C determines whether the node can support the route request RREQ. If the node cannot support the particular request RREQ, then the request is denied or simply not forwarded by the node. If the node, for example node A, can support the particular request RREQ, then the node forwards the route request RREQ to other intermediate nodes, e.g node H, on all channels and temporarily reserves node resources for that route request if the request is for traffic other than best-effort. For best-effort, no resources necessarily need be reserved. The route request RREQ is eventually forwarded to the destination node D.

Figure 3:
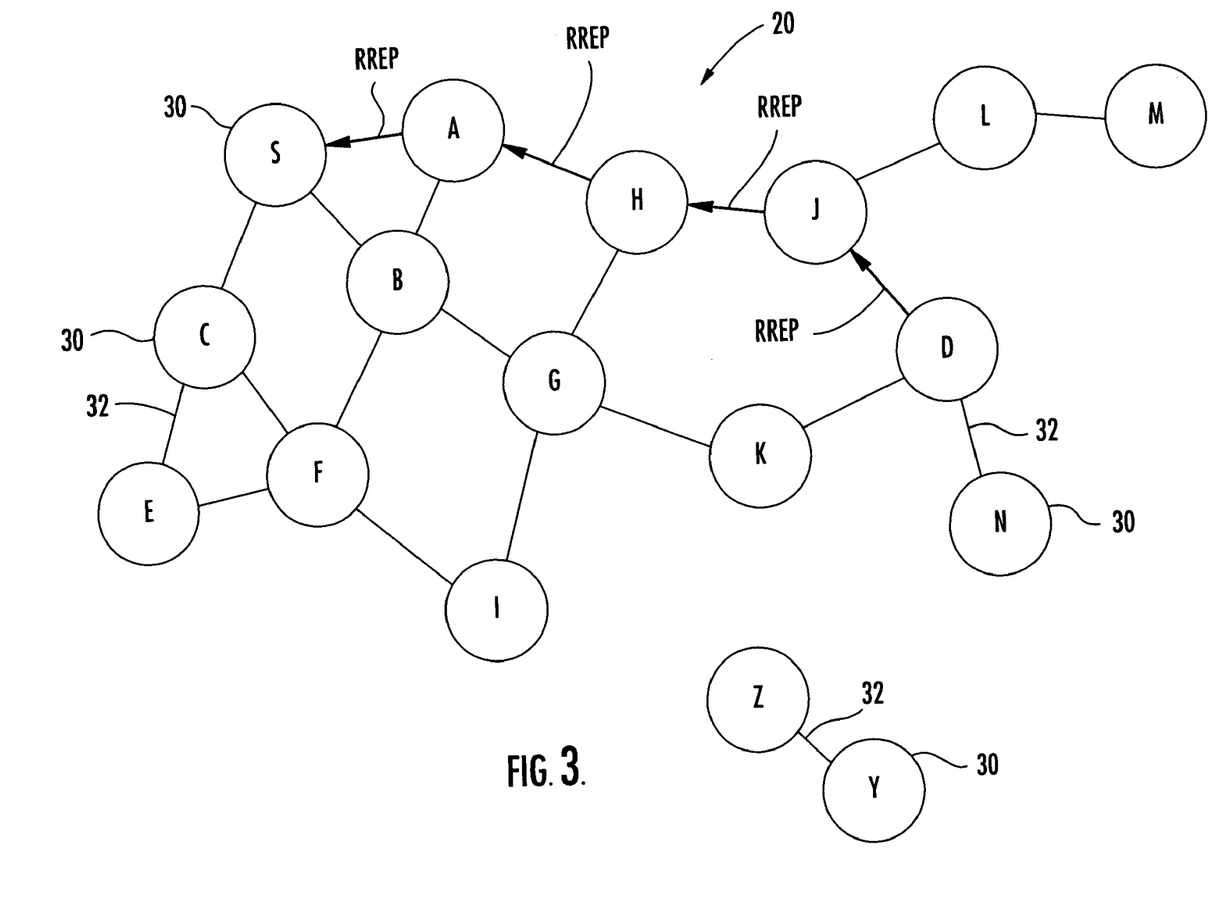
Figure 4:
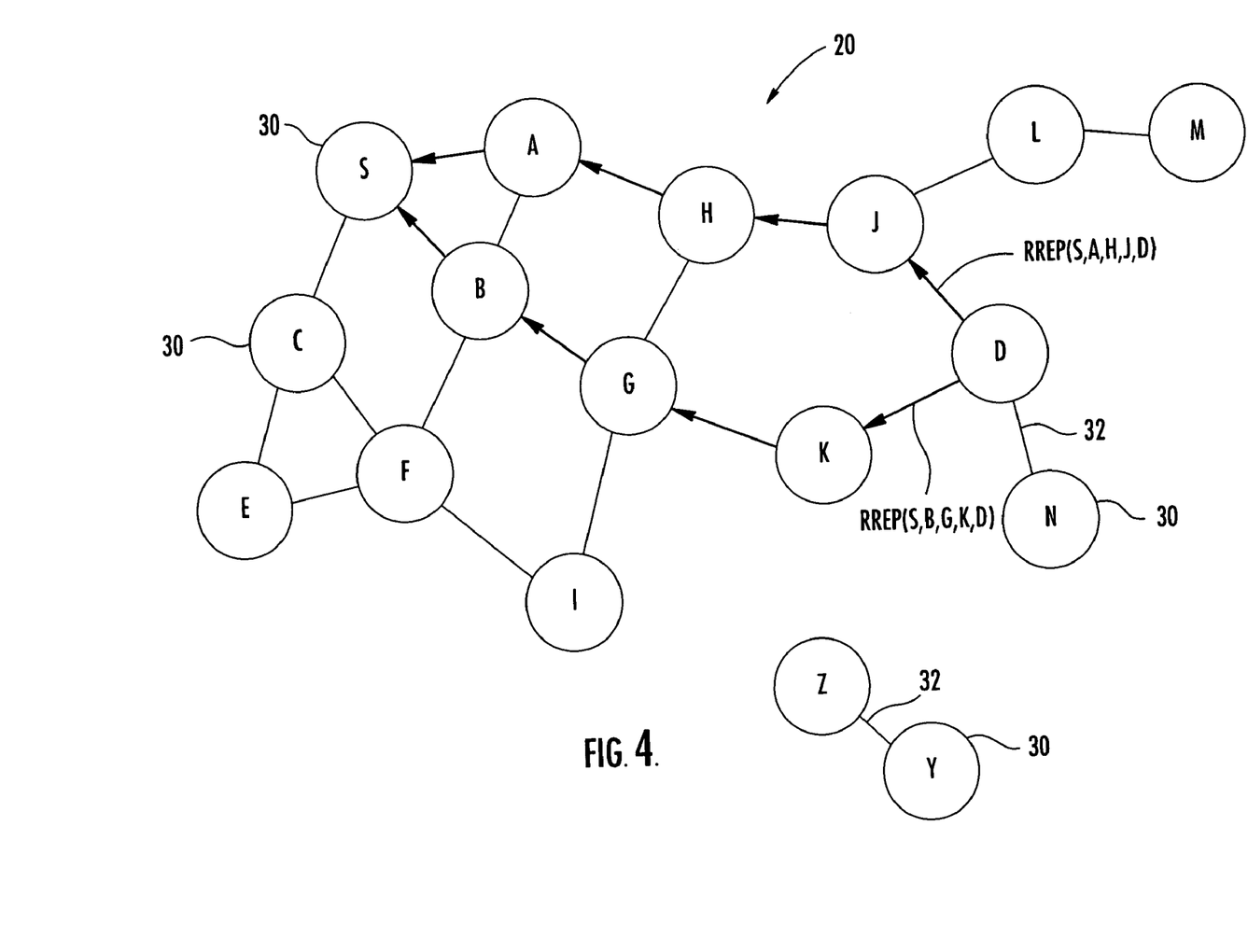
Figure 5:
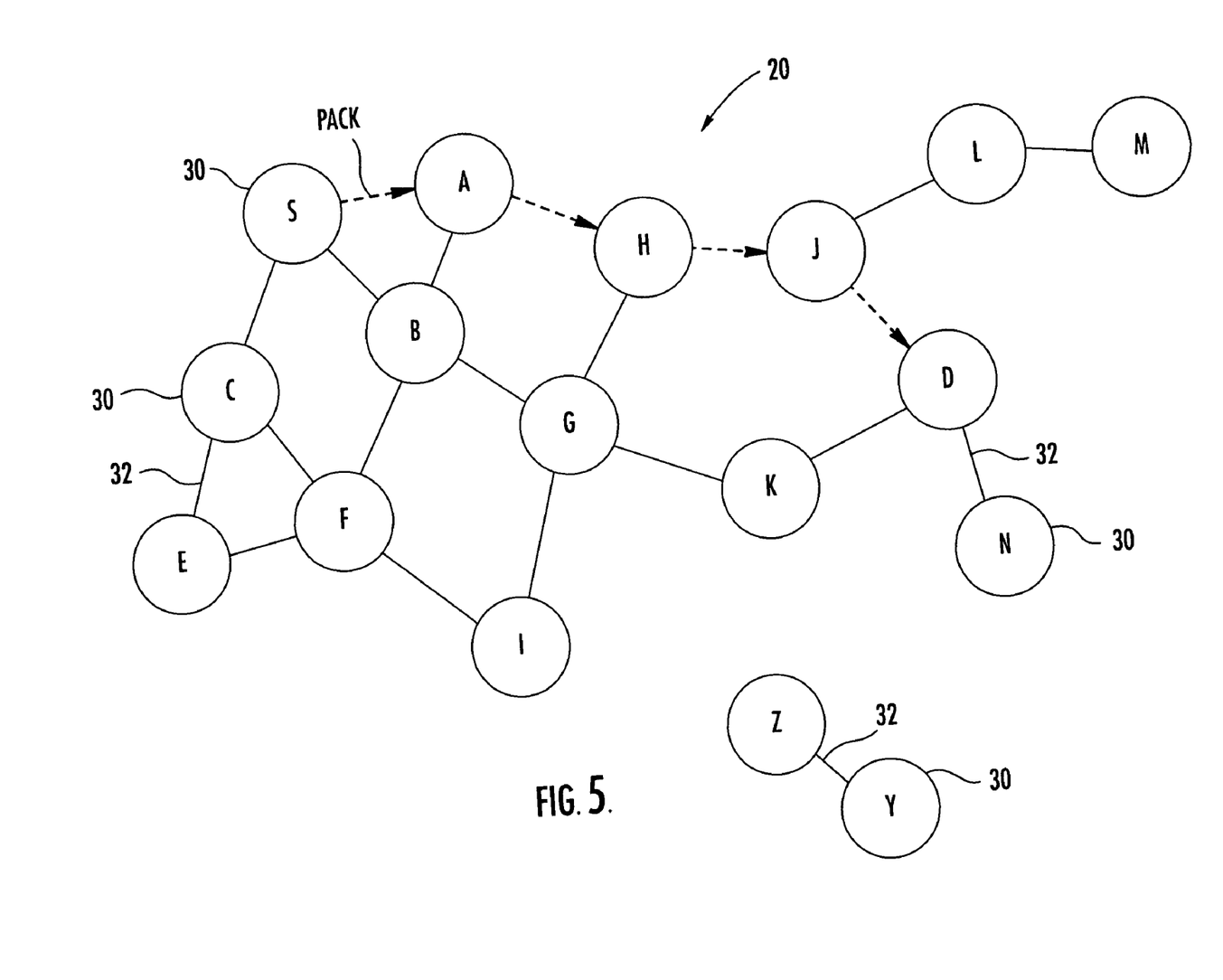

As illustrated in FIG. 3, the destination node D, upon receiving the route request RREQ, generates a reply RREP to the source node S (block 104). However, as illustrated in FIG. 4, the destination node D may have received the forwarded route request RREQ from any of various possible routes including, for example, S-A-H-J-D or S-B-G-K-D. A reply RREPQ is generated in each case. The reply RREP includes the discovered route from S to D, and is sent to the source node S back along a route obtained by reversing the route appended to the route request RREQ received by the destination node D. In the example illustrated in FIGS. 3 and 4, if nodes D, J, H and A are on a different channel than the source node S, then the last hop A must move to the same channel as the source node S and send the reply RREP with an indication of its normal channel. The RREPs include not only the list of nodes along the route, but which channel each node is on.

The source node S caches each discovered route including the channel to the first hop node. At block 106, the source node S may prioritize the discovered routes by calculating a metric for each discovered route to the destination node D. The metric may be based upon at least one of available bandwidth, error rate, end-to-end delay, end-to-end delay variation, hop count, expected path durability, and priority, for example. The selected route to the destination node may include more than one of the plurality of channels. In other words, the selected route may be wholly, or in part, on a different channel than the source node.

Also, at block 108, the source node S then selects a route to the destination node D based upon the route metrics, and preferably transmits route confirmations CONFQ to intermediate nodes on the selected route. This is to confirm the use of the resources on the selected route that were temporarily reserved. Other temporarily reserved resources on discovered but non-selected routes may be permitted to time out by not transmitting CONFQ on those routes. Use of CONFQ is associated with confirming use of resources for traffic that requires a QoS other that just best-effort. Route discovery for best-effort need not involve reserving resources at each intermediate node. Once the route is selected, message/packet data may be transmitted from the source node S to the destination node D via the selected route and on the appropriate channels, at Block 110, thus concluding the method (Block 112). As used herein, "message data" is intended to include any data that may be sent between nodes in the mobile ad-hoc network, including (but not limited to) additional route requests/replies, video data, audio data, alphanumeric data, etc., as would be appreciated by the skilled artisan.

The described method can be applied to any type of On-Demand or Reactive routing protocol, such as Dynamic Source Routing (DSR) or Ad-Hoc On-Demand Distance Vector (AODV) routing, or to any hybrid proactive/reactive protocol, such as Zone Routing Protocol (ZRP), as would be appreciated by the skilled artisan. A similar approach may also be used with proactive routing protocols to discover the best route spanning nodes that may be on different channels.

The described procedures are easily applied to the DSR protocol. The conventional DSR message types RREQ, RREP, RRER are defined as optional packet types, and can be used as defined for the conventional operation of the protocol to support "best effort" traffic in a backwards compatibility mode. Modified optional packet types may be defined to support multi-channel routing. Definition of the required header fields for these types is straightforward based on the functions defined above. A special type of source routed packet for mission data may also be included.

Figure 6:
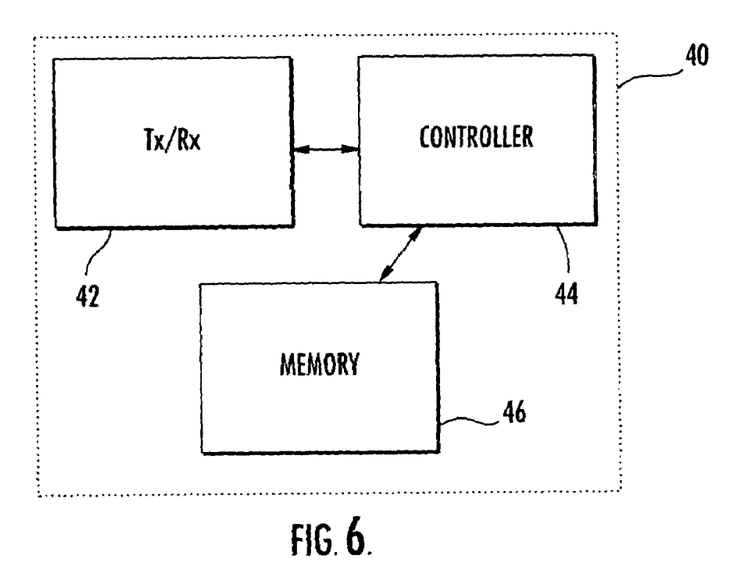
FIG. 6 is a schematic diagram illustrating a router of a node in accordance with the network of the present invention.
Figure 7:
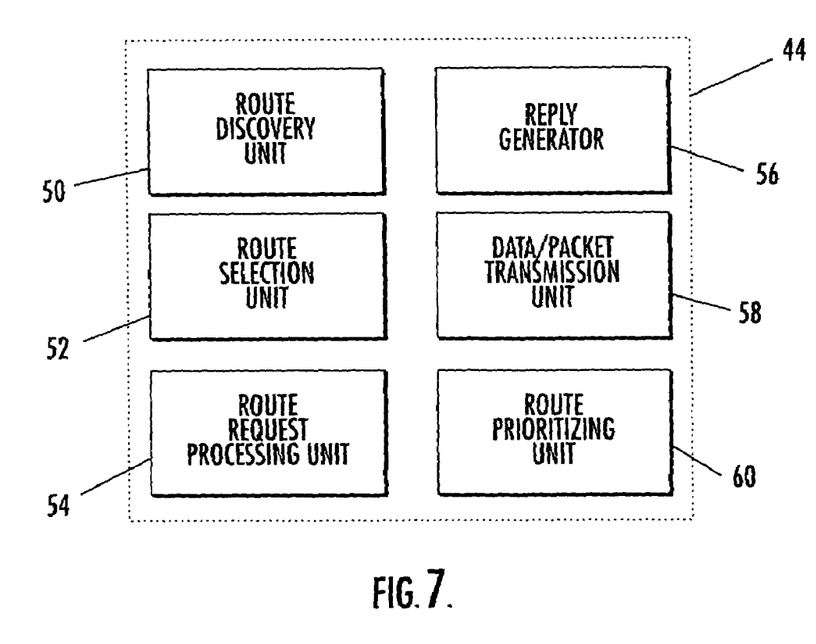
FIG. 7 is a schematic diagram illustrating the details of the controller of the router in FIG. 6.

Referring now additionally to FIGS. 6 and 7, a system aspect of the invention will be described. As previously discussed, the mobile ad hoc network 20 includes a plurality of mobile nodes 30, and a plurality of wireless communication links 32 connecting the plurality of mobile nodes together. Each mobile node 30 includes a router 40 (FIG. 6) that has a communications device 42 to wirelessly and uni-directionally or bi-directionally communicate with other nodes over multiple channels and via the wireless communication links 32, and a controller 44 to route communications via the communications device 42. Also, a memory 46 may be included as part of the controller 44 or in connection with the controller.

As shown in FIG. 7, the controller 44 includes a route discovery unit 50 to transmit route requests RREQ over each of the plurality of channels to discover routing to the destination node D, and a route selection unit 52 to select a route to the destination node on at least one of the plurality of channels. The route discovery unit 50 may send the route request over each of the plurality of channels sequentially, and the route request may include a channel identifier. The selected route to the destination node may include more than one of the plurality of channels.

The controller 44 may further include a route request processing unit 54 to determine whether the node 30 can support the route requested and, if so, to forward the route request RREQ to one of other intermediate nodes and the destination node D. Also, the controller 44 may include a reply generator 56 to generate the route reply RREP to the source node S for each discovered route. Again, generating the reply RREP to the source node S for each discovered route preferably includes sending the reply back to the source node along the discovered route in reverse.

The controller 44 may also include a data transmission unit 58 to send a message/transmission to the destination node D along the selected route, and a route prioritizing unit 60 to prioritize discovered routes. Again, prioritizing may include calculating a metric for each discovered route to the destination node. The metric may be based upon at least one of available bandwidth, error rate, end-to-end delay, end-to-end delay variation, hop count, expected path durability, and priority.

The present invention may make use of dynamic channel allocation in a mobile ad hoc network to efficiently make use of the plurality of channels, as described in copending application Ser. No. 10/134,862, filed Apr. 29, 2002 by the same assignee of record and incorporated by reference herein in its entirety. IEEE 802.11 spinoffs like 802.11a will make use of the ISM spectrum in the 5 GHz band. In this band, there is more bandwidth available to support many channels. As a result, a process to automatically assign a channel to an 802.11 node would be important. Such a channel decision would be based on current channel utilization and sampling of the other channels. Using dynamic channel selection would provide better performance since the spectrum would be used evenly. Additionally, channel use could be throttled such that Quality of Service (QoS) is maintained for current stations using the channel.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A method for operating a mobile ad hoc network comprising a plurality of wireless mobile nodes and a plurality of wireless communication links connecting the plurality of nodes together over a plurality of electrically separate wireless channels, the method comprising:
    at a source node, sending a route request over each of the plurality of electrically separate channels to discover routing to a destination node;
    at each intermediate node, determining whether the intermediate node can support the route requested and, if so, forwarding the route request to other intermediate nodes and the destination node over each of the plurality of electrically separate channels;
    at the destination node, upon receiving the route request, generating a reply to the source node for each discovered route;
    at the source node, selecting a route to the destination node on at least one of the plurality of electrically separate channels; and
    at the source node, sending a transmission to the destination node along the selected route.

2. A method according to claim 1 wherein the source node sends the route request over each of the plurality of channels sequentially.

3. A method according to claim 1 wherein the route request includes a source node channel identifier.

4. A method according to claim 1 wherein generating the reply to the source node for each discovered route comprises sending the reply back to the source node along the discovered route in reverse.

5. A method according to claim 1 further comprising, at the source node, prioritizing discovered routes.

6. A method according to claim 5 wherein prioritizing comprises calculating a metric for each discovered route to the destination node, the metric being based upon at least one of available bandwidth, error rate, end-to-end delay, end-to-end delay variation, hop count, expected path durability, and priority.

7. A method according to claim 1 wherein a selected route to the destination node includes more than one of the plurality of channels.

8. A method for operating a mobile ad hoc network comprising a plurality of wireless mobile nodes and a plurality of wireless communication links connecting the plurality of nodes together over a plurality of electrically separate wireless channels, the method comprising:
    at a source node, sending a route request over each of the plurality of electrically separate channels to discover routing to a destination node; and
    at the source node, selecting a route to the destination node on at least one of the plurality of electrically separate channels.

9. A method according to claim 8 further comprising, at each intermediate node, determining whether the intermediate node can support the route requested and, if so, forwarding the route request to one of other intermediate nodes and the destination node.

10. A method according to claim 8 further comprising, at the destination node, upon receiving the route request, generating a reply to the source node for each discovered route.

11. A method according to claim 10 wherein generating the reply to the source node for each discovered route comprises sending the reply back to the source node along the discovered route in reverse.

12. A method according to claim 8 further comprising, at the source node, sending a transmission to the destination node along the selected route.

13. A method according to claim 8 wherein the source node sends the route request over each of the plurality of channels sequentially.

14. A method according to claim 8 wherein the route request includes a source node channel identifier.

15. A method according to claim 8 further comprising, at the source node, prioritizing discovered routes.

16. A method according to claim 15 wherein prioritizing comprises calculating a metric for each discovered route to the destination node, the metric being based upon at least one of available bandwidth, error rate, end-to-end delay, end-to-end delay variation, hop count, expected path durability, and priority.

17. A method according to claim 8 wherein a selected route to the destination node includes more than one of the plurality of channels.

18. A mobile ad hoc network comprising:
    a plurality of mobile nodes; and
    a plurality of wireless communication links connecting the plurality of mobile nodes together over a plurality of electrically separate wireless channels;
    each mobile node comprising
        a communications device to wirelessly communicate with other nodes of the plurality of nodes via the wireless communication links, and
        a controller to route communications via the communications device, and comprising
            a route discovery unit to transmit route requests over each of the plurality of electrically separate channels to discover routing to a destination node, and
            a route selection unit to select a route to the destination node on at least one of the plurality of electrically separate channels.

19. The mobile ad hoc network according to claim 18 wherein the controller further comprises a route request processing unit to determine whether the node can support the route requested and, if so, to forward the route request to one of other intermediate nodes and the destination node.

20. The mobile ad hoc network according to claim 18 wherein the controller further comprises a reply generator to generate a route reply to a source node for each discovered route.

21. The mobile ad hoc network according to claim 20 wherein generating the route reply to the source node for each discovered route comprises sending the reply back to the source node along the discovered route in reverse.

22. The mobile ad hoc network according to claim 18 wherein the controller further comprises a data transmission unit to send a transmission to the destination node along the selected route.

23. The mobile ad hoc network according to claim 18 wherein the route discovery unit sends the route request over each of the plurality of channels sequentially.

24. The mobile ad hoc network according to claim 18 wherein the route request includes a channel identifier.

25. The mobile ad hoc network according to claim 18 wherein the controller further comprises a route prioritizing unit to prioritize discovered routes.

26. The mobile ad hoc network according to claim 25 wherein the prioritizing unit calculates a metric for each discovered route to the destination node, the metric being based upon at least one of available bandwidth, error rate, end-to-end delay, end-to-end delay variation, hop count, expected path durability, and priority.

27. The mobile ad hoc network according to claim 18 wherein a selected route to the destination node includes more than one of the plurality of channels.

* * * * *